Aug. 1, 1961      F. W. BARNARD      2,994,501
BEDSTEAD ATTACHMENT

Filed Dec. 19, 1957      2 Sheets-Sheet 1

INVENTOR.
Frank W. Barnard
BY Robert R. Churchill

ATTORNEY

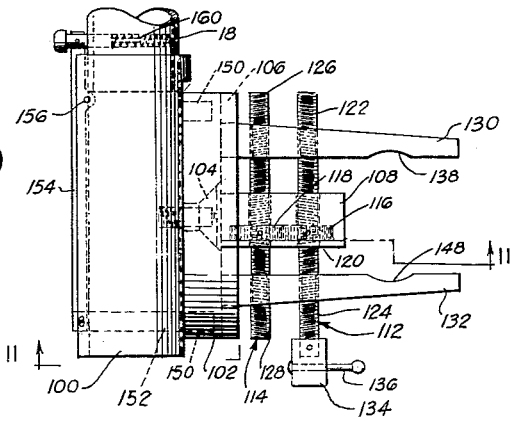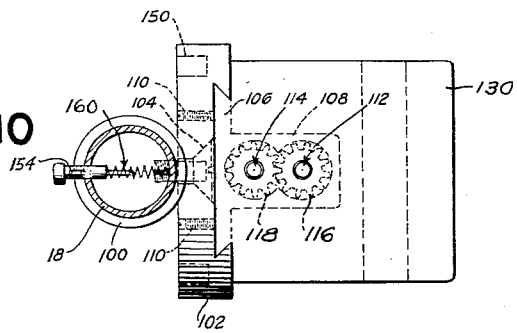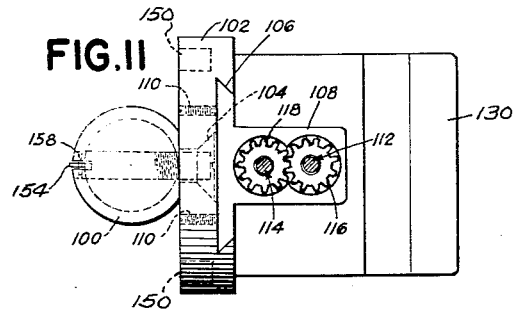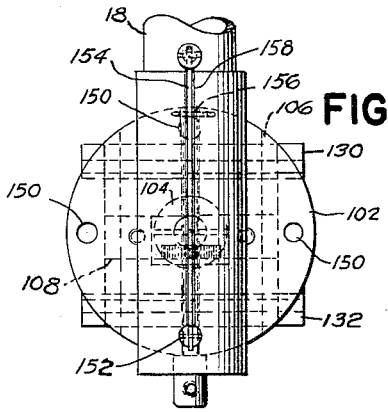

United States Patent Office 2,994,501
Patented Aug. 1, 1961

2,994,501
BEDSTEAD ATTACHMENT
Frank W. Barnard, Windham, N.H.
Filed Dec. 19, 1957, Ser. No. 703,870
4 Claims. (Cl. 248—226)

This invention relates to a bedstead attachment particularly adapted for use in a hospital for supporting receptacles required for treatment of a patient.

The invention has for an object to provide a novel and improved bedstead attachment of the character specified which is adapted to be detachably clamped to the bed frame in a novel and convenient manner, and which is capable of adjustment in a simple and efficient manner to dispose the attachment in a desired position.

With this general object in view and such others as as may hereinafter appear, the invention consists in the bedstead attachment as hereinafter described and particularly defined in the claims at the end of this specification.

In the drawings:

FIGS. 7 and 8 are front and side elevations respectively of a modified form of adjustment to be referred to;

FIG. 9 is a side elevation of a modified form of clamping mechanism;

FIG. 10 is a plan view of the clamping mechanism shown in FIG. 9;

FIG. 11 is a horizontal cross section taken on the line 11—11 of FIG. 9 as seen from the underside of the modified clamping mechanism; and FIG. 12 is a rear view of the clamping mechanism as seen from the left in FIG. 9.

In general the present invention contemplates a novel bedstead attachment particularly adapted for use in a hospital and which may be conveniently attached to the frame of a bed and adjusted in a desired position to support receptacles, such as intravenous feeder containers and the like, for use in the treatment of a patient. In the illustrated embodiment of the invention the attachment comprises a right angle tubular structure, one leg of the structure being provided with a clamping device for detachably securing the attachment to the bed frame, the other leg having depending hook portions from which the hospital receptacles may be suspended.

In accordance with one feature of the present invention, the novel clamping device is designed to accommodate and is capable of adjustment to fit bed frame members of different sizes and shapes in cross section, such as bed frame members of rectangular or cylindrical cross section. In accordance with another feature of the invention the right angle structure may be rotatably adjusted relative to the clamping device whereby to permit the attachment to be clamped either to a horizontal frame member or to a vertical frame member of the bed frame. Each leg of the structure is also capable of telescopic extension, and the legs are capable of rotary adjustment relative to each other. Thus, for example, when the attachment is clamped to a horizontal frame member the clamped leg may extend vertically, and the receptacle supporting leg may extend horizontally, the horizontal leg being capable of swinging movement about the axis of the vertical leg to dispose the horizontal leg in a desired position either transversely of or longitudinally of the bed. In another example if it is desired to clamp the structure to a vertical frame member, the right angle structure may be rotated 90° relative to the clamp member and locked in its rotated position to extend the clamp leg horizontally and the hook carrying leg may be rotated about the axis of the clamped leg to a horizontal or other desired angle, provision being made for clamping the rotated leg in its adjusted position. When the clamping device is clamped to bed frame members of cylindrical cross section it will be apparent that the angular disposition of the clamping device relative to the frame member may be varied as desired to extend the clamped leg at various angular positions to accommodate different conditions. Thus, the present receptacle supporting structure provides a conveniently detachable device capable of attachment to different portions of the bed and capable of adjustment angularly and extensibly in different directions to accommodate the different conditions which may present themselves for the purpose specified.

Figure 1:
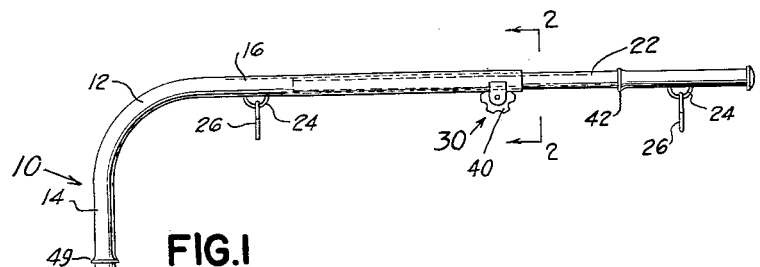
FIG. 1 is a side elevation of the bedstead attachment embodying the present invention.

Referring now to the drawings, the present bedstead attachment is indicated in its entirety by the numeral 10 in FIG. 1 and comprises in general a right angle tubular member 12 having legs 14, 16, the corner bend being preferably rounded as shown. One leg, 14, is telescopically mounted in one end of an elongated tubular support 18, the other end of the support 18 being connected to a clamping device indicated generally at 20. The leg 16 of the member 12 is arranged to telescopically receive an extensible tubular member 22, and the leg 16 and its extensible member 22 are each provided with a loop 24, each of which carries a hook member 26 on which the hospital receptacles, not shown, may be hung in a depending position.

Figure 2:
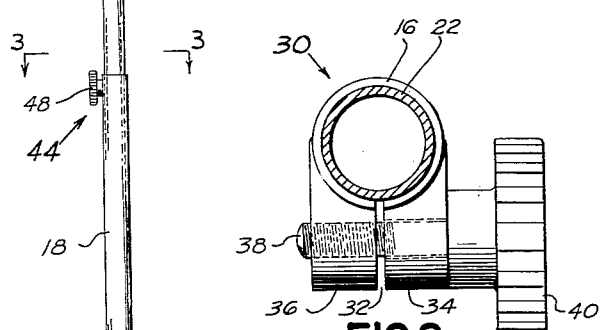
FIG. 2 is a vertical cross section taken on the line 2—2 of FIG. 1.

The tubular member 22 is extensibly adjustable in the leg 16, the latter being provided with a clamping unit 30 adjacent its outer end which may comprise a lateral extension welded to the tube 16 and provided with a saw cut 32 extending through the adjacent wall of the tube 16 as shown. One half 34 of the saw cut lateral extension is provided with a clearance hole, and the other half 36 is provided with a threaded opening for receiving a clamping screw 38 having a handle 40 for manually adjusting the clamp unit as illustrated in detail in FIG. 2. The extensible member 22 may be provided with a shouldered stop portion 42 for limiting the inwardly adjusted position of the member.

Figure 3:
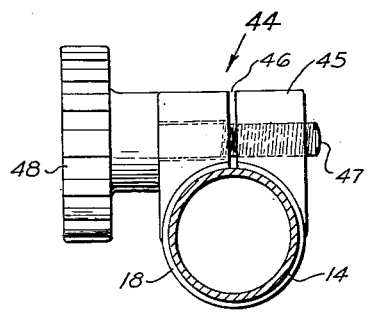
FIG. 3 is a horizontal cross section taken on the line 3—3 of FIG. 1.
Figure 4:
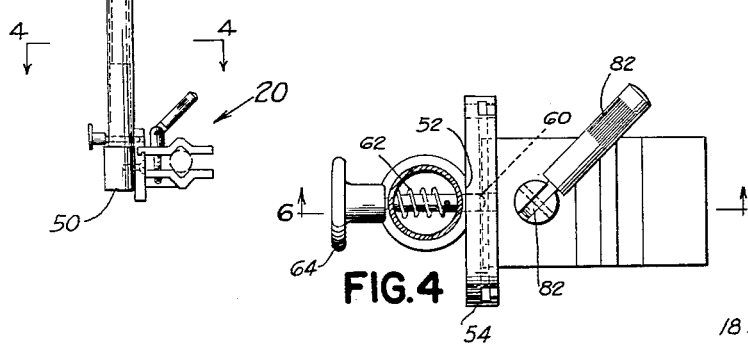
FIG. 4 is a plan view as seen from the line 4—4 of FIG. 1 of the clamping unit.

The supporting tube 18 is provided with a similar clamping unit 44, as shown in detail in FIG. 3, for clamping the leg 14 in an extensibly adjusted position, the clamping unit 44 also comprising a laterally extended welded portion 45 having a saw cut 46 and provided with a manually adjusted clamping screw 47 having a handle 48. The leg 14 may also be provided with a shouldered portion 49 for limiting its inward telescopic extension relative to its supporting tube 18.

Figure 6:
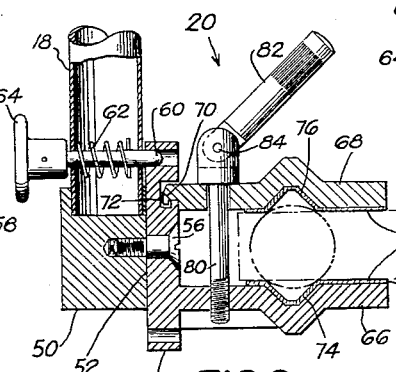
FIG. 6 is a horizontal section taken on the line 6—6 of FIG. 4.

The lower end of the supporting tube 18 is fitted into and secured to a cylindrical end member 50 having a flatted portion 52 on one side thereof and on which the bed frame clamping device 20 is mounted for rotary adjustment. As shown in detail in FIG. 6, the clamping device is provided with a circular jaw supporting disk 54 secured to the flatted portion of the end member 50 by a central shoulder screw 56, herein shown as a flat head screw threadedly engaged with the end member 50. The clamping device is capable of rotary movement relative to the end member 50 and, as herein shown, the disk 54 is provided with four openings 58 adjacent the marginal edge thereof for receiving a locking pin 60 mounted in and extended through the supporting tube 18. The pin 60 is urged into engagement with an opening in the disk by a spring 62 connected at one end to an intermediate portion of the pin, the free end of the spring bearing against the inner wall of the tube 18 as shown. The outer end of the pin 60 may be provided with a handle 64 for manually retracting the locking pin from one opening to permit rotation of the clamping device 20 and release of the pin into another opening to dispose the clamping device in a different position of adjustment relative to the tube 18.

The clamping device 20 includes a lower fixed jaw 66 extended from and integral with the disk 54 and an upper adjustable jaw 68 having a grooved and hooked end portion 70 adapted to slide into an L slot 72 provided in the disk 54. In assembling the jaw 68 it is extended longitudinally into the slot and into alignment with the lower jaw 66. Substantial clearance is afforded between the hooked and grooved portion 70 and the L slot 72 so that in practice the adjustable jaw 68 is capable of pivotal rocking movement in the L slot relative to the fixed jaw. The jaws 66, 68 are each provided wiht opposed V-shaped grooves 74, 76, preferably provided with a friction providing lining material 78, and adapted to engage and grip opposed sides of a tubular frame member therebetween. The jaws are also provided with flat clamping surfaces, as indicated at 79, for clamping engagement with rectangular frame members. A clamp screw 80 extended through a clearance opening in the upper jaw 68 is engaged with a threaded opening in the lower jaw 66 as shown. The head of the clamp screw is slotted to receive the flattened end of a knurled handle 82 connected to the head by a pin 84.

Figures 7, 8:
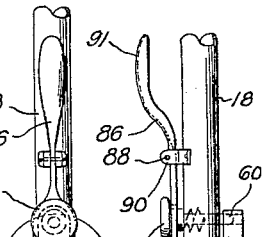

In a modified form of the invention, as shown in FIGS. 7 and 8, the manually retractable locking pin 60 may be provided with a two-armed retracting lever 86 pivotally mounted at 88 on a bracket 90 secured to the tube 18. The lever 86 is bifurcated at one end and fitted over the hub of the handle 64 as shown. The other end of the lever is provided with a thumb engaging portion 91 by which the pin may be retracted by downward pressure.

Figure 5:
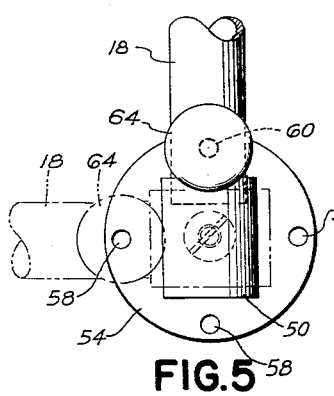
FIG. 5 is an end view of the clamping unit shown in FIG. 4 illustrating an adjustment feature.

From the above description it will be seen that in one position of operation the clamping device 20 may be operatively engaged with a longitudinally extended horizontal frame member of a bedstead, with the supporting tube 18 locked in a vertically extended position relative to the clamping unit 20. In this position the leg 14 of the right angle structure may be extended vertically and adjusted to the desired height and clamped in its adjusted position by the clamping unit 44, and the leg 16 of the right angle structure may be extended horizontally, the tube 22 being capable of longitudinal extension and clamped in its adjusted position by the clamping unit 30. As thus attached to the bed the leg 16 may extend transversely of the bed, or the leg 16 may be adjustably rotated relative to the vertical supporting tube 18 to any convenient angle desired, such as parallel to the bed. In a second possible position of operation the clamping device 20 may be operatively clamped to a vertical frame member either at the head or foot of the bed. In this position the supporting tube 18 may be adjusted relative to the clamping device to extend the supporting tube 18 in a horizontal position by retracting the pin 60 from one opening and rotating the tube 90° relative to the clamping unit to present the pin into another opening as indicated in dotted lines in FIG. 5. The leg 14 may also be rotated in its tube 18 to extend the same horizontally or in any other desired angle for the purpose defined. Other positions of adjustment will suggest themselves in accordance with the different conditions which may be encountered. For example, the extensible tube 22 may be rotated relative to its supporting leg 16 to present its loop 24 and hook 26 in a depending position when the supporting tube is extended horizontally from a vertical frame member of the bed as above described. It will also be observed that the clamping device 20 may be clamped to the edge of a flat table, such as an X-ray table, operating table, or like support, whenever it is required to support a hospital receptacle, such as a plasma bottle in position to treat a patient. It will also be apparent that the present clamping device may be adjustably secured to cylindrical frame members of different cross sectional diameters or rectangular frame members of different sizes, the pivotal action of the upper clamping jaw providing a simple, convenient and rapid manner of detachably connecting the supporting structure to the bedstead or other convenient support. The present bedstead attachment is also of advantage in that it takes up a minimum of space and leaves the floor space around the bed clear, the structure being easily and quickly detached and stored in an out-of-the-way place when not in use, or transported to another location for use.

Referring now to FIGS. 9 to 12 illustrating a modified form of clamping mechanism, as therein shown, the lower end of the elongated tubular support 18 is fixed in an end member 100 to which a rotatably mounted disk 102 is secured by a central, flat-head shoulder screw 104. The disk 102 is provided with a dimetral V-groove 106 in its front face into which a laterally extended supporting member 108 is received and is fixed in a central position by set screws 110 carried by the disk. As shown, the top of the central, flat-head screw 104 may be flush with or slightly below the bottom of the V-groove 106 and is assembled prior to inserting the supporting member 108 into the groove. The supporting member 108 is provided with two spaced clearance openings through which a pair of cooperating adjusting screws 112, 114 are extended, each screw being provided with a gear 116, 118 secured thereto and supported in meshing relation in counterbored portions concentric with the clearance openings and formed in the underside of the member 108. A retaining gib 120 may be secured to the underside of the member 108 and in engagement with the outer faces of the gears, as shown, to hold the adjusting screws from longitudinal axial displacement.

The adjusting screws 112, 114 are threaded in opposite directions at their upper and lower ends, the screw 112 having a left hand thread 122 at its upper end and a right hand thread 124 at its lower end. The screw 114, rotated in the opposite direction through the intermeshing gears 116, 118, is provided with a right hand thread 126 at its upper end and a left hand thread 128 at its lower end. The screws are engaged in the threaded openings formed in an upper clamping jaw 130 and a lower clamping jaw 132, as shown, each jaw having V-shaped inner end portions fitted into and adjustably slidable in the upper and lower ends respectively of the V-groove 106. One of the screws, 112, may be provided with an enlarged head portion 134 having a pin 136 extended therethrough for convenience in effecting manual rotation of the screws. The jaws 130, 132 may be provided with opposed concave cutouts 138, 148 on their inner faces arranged for cooperation with cylindrical frame suporting members, the flat surfaces of the jaws being arranged for cooperation with the edge of a table or like support.

In operation it will be seen that rotation of the screw 112 will also effect rotation of the screw 114 to effect movement of the jaws toward or away from each other. Provision is also made in the modified form of the invention for adjustably rotating the clamping unit relative to the elongated tubular support 18. As illustrated, the disk 102 is provided with four openings 150 arranged circumferentially and spaced ninety degrees apart, and a locking pin 152 slidingly mounted in the lower end of the end member 100 and aligned to engage an opening 150 is connected by a lever 154 pivotally mounted at 156 in the end member 100. The lever 154 operates in a slotted portion 158 formed in the end member, the upper end of the lever being spring pressed outwardly by a coil spring 160 secured within the lower end of the member 18, as shown. The lever 154 is thus urged in a direction to extend the pin 152 into an opening 150, and depression of the lever against the spring 160 will retract the pin to permit rotation of the clamp unit relative to the support to a position in which the pin will be extended into a different opening 150.

While the preferred embodiment of the invention has been herein illustrated and described, it will be understood that the invention may be embodied in other forms within the scope of the following claims.

Having thus described the invention, what is claimed is:

1. A support for hospital use comprising an elongated supporting tube having a clamping device rotatably mounted at one end thereof for detachably securing the supporting tube to a supporting structure and to enable the supporting tube to be rotated through 360° and adjusted to different positions relative to the supporting structure, a plurality of tubular members telescopically connected one to the other, one tubular member being telescopically connected to the other end of the elongated supporting tube, each of said plurality of tubular members being longitudinally and rotatably adjustable relative to each other, and at least one tubular member being provided with means for supporting an article therefrom to enable the article to be supported in various adjusted positions relative to the supporting structure to which it is secured, said clamping device comprising a circular disk, one face of said disk engaging said one end, a central screw in said disk for securing the disk to said one end about which the disk is rotatably adjusted, means for locking the disk relative to said one end in its adjusted position, a pair of jaws carried by and extended at right angles from the opposite face of said disk, said opposite face including a recess, at least one of said jaws mounted in said recess for relative movement toward and from the other, and screw means extended through both of said jaws for moving said jaws into clamping engagement with a supporting structure.

2. A support as defined in claim 1 wherein each of said tubular members is provided with stop means for limiting the telescopic adjustment of said members relative to one another, and wherein clamp means is provided for securing each of said tubular members in an adjusted position.

3. A supporting attachment for hospital use comprising a plurality of longitudinally and rotatably adjustable tubular members, one of said tubular members having a clamping device rotatably mounted thereon for detachably securing said one tubular member to a supporting structure, at least one of the other tubular members having means for supporting hospital articles, said clamping device including a rotatably mounted clamp jaw supporting member capable of rotation through 360° relative to said one tubular member, a pair of clamping jaws slidably mounted in said rotatably mounted jaw supporting member for sliding adjustment toward or away from each other, an intermediate fixed member secured to said jaw supporting member, and an adjusting screw supported in said intermediate fixed member and threaded in opposite directions at its opposed ends for cooperation with the jaws to effect movement of each of said jaws toward or away from each other on rotation of the screw.

4. A supporting attachment as defined in claim 3 wherein the rotatably mounted jaw supporting member comprises a disk having circumferentially spaced openings therein, and a dimetral groove within which the jaws are slidably mounted.

References Cited in the file of this patent

UNITED STATES PATENTS

| 297,786 | Goodman | Apr. 29, 1884 |
| 517,677 | Bender | Apr. 3, 1894 |
| 625,032 | Homan | May 16, 1899 |
| 872,905 | Connors | Dec. 3, 1907 |
| 1,283,446 | Anderson | Nov. 5, 1918 |
| 1,537,958 | Marshall | May 19, 1925 |
| 2,526,070 | Early | Oct. 17, 1950 |
| 2,686,030 | Johnson | Aug. 10, 1954 |
| 2,711,300 | Nelson | June 21, 1955 |

FOREIGN PATENTS

| 15,209 | Great Britain | Aug. 27, 1900 |
| 79,536 | Switzerland | Apr. 16, 1919 |